(12) United States Patent
Grubb

(10) Patent No.: US 10,359,550 B2
(45) Date of Patent: Jul. 23, 2019

(54) MULTI-LAYERED REFLECTIVE INSULATION SYSTEM

(71) Applicant: EFX Energy Technologies, LLC

(72) Inventor: Dennis Grubb, Socorro, NM (US)

(73) Assignee: EFX Energy Technologies, LLC, Socoro, NM (US)

( * ) Notice: Subject to any disclaimer, the term of this patent is extended or adjusted under 35 U.S.C. 154(b) by 0 days.

(21) Appl. No.: 15/253,425

(22) Filed: Aug. 31, 2016

(65) Prior Publication Data
US 2018/0059299 A1    Mar. 1, 2018

(51) Int. Cl.
G02B 5/20 (2006.01)
G02B 5/26 (2006.01)
G02B 1/14 (2015.01)
G02B 5/02 (2006.01)
B32B 37/12 (2006.01)
(Continued)

(52) U.S. Cl.
CPC ............. *G02B 5/26* (2013.01); *B32B 5/18* (2013.01); *B32B 27/306* (2013.01); *B32B 27/32* (2013.01); *B32B 37/12* (2013.01); *G02B 1/14* (2015.01); *G02B 5/0284* (2013.01); *G02B 5/0294* (2013.01); *G02B 5/128* (2013.01); *B32B 2250/05* (2013.01); *B32B 2264/101* (2013.01); *B32B 2266/025* (2013.01); *B32B 2266/0221* (2013.01); *B32B 2305/022* (2013.01); *B32B 2307/304* (2013.01); *B32B 2307/416* (2013.01); *B32B 2323/04* (2013.01); *B32B 2331/04* (2013.01); *B32B 2551/00* (2013.01); *G02B 5/208* (2013.01)

(58) Field of Classification Search
CPC ... G02B 1/14; G02B 5/26; G02B 5/18; G02B 5/0284; G02B 5/0294

USPC ........................................................ 359/359
See application file for complete search history.

(56) References Cited

U.S. PATENT DOCUMENTS 3,619,340 A   11/1971   Jones
4,303,729 A   12/1981   Torobin
(Continued)

FOREIGN PATENT DOCUMENTS

WO    WO 2010022423 A1    3/2010

OTHER PUBLICATIONS

International Search Report and Written Opinion of the International Searching Authority Covering PCT/US2016/49725 filed Aug. 31, 2016.

*Primary Examiner* — William R Alexander
(74) *Attorney, Agent, or Firm* — Brick Gentry PC; Brian J. Laurenzo; Jessica L. Susie

(57) ABSTRACT

The present invention relates generally to multi-layered reflective insulating composites and a method of fabricating those composites. The present invention comprises a multi-layered reflective insulation system comprising a first protective layer; a first scattering optic layer; microsphere film layers; a polyblend foam layer; a second scattering optic layer; and a second protective layer. The present invention also comprises a method of manufacture of a multi-layered reflective insulation system comprising a first protective layer; a first scattering optic layer; microsphere film layers; a polyblend foam layer; a second scattering optic layer; a second protective layer; securably disposing the layers on top of each other; and securably attaching the layers. The multi-layered reflective insulation system provides a cost-effective and efficient insulation system.

17 Claims, 2 Drawing Sheets

(51) Int. Cl.
  *B32B 5/18* (2006.01)
  *B32B 27/30* (2006.01)
  *B32B 27/32* (2006.01)
  *G02B 5/128* (2006.01)

(56) References Cited

U.S. PATENT DOCUMENTS

| | | | |
|---|---|---|---|
| 4,442,165 A | 4/1984 | Gebhardt et al. | |
| 6,284,809 B1 | 9/2001 | Plummer et al. | |
| 6,858,280 B2 | 2/2005 | Allen | |
| 8,397,765 B2 | 3/2013 | Jackson | |
| 8,857,700 B2 | 10/2014 | Jackson | |
| 9,229,260 B2* | 1/2016 | Cok | G02F 1/13338 |
| 9,435,923 B2* | 9/2016 | Kohno | G02B 5/206 |
| 9,678,256 B2* | 6/2017 | Miyata | G02B 5/208 |
| 9,778,402 B2* | 10/2017 | Taka | G02B 5/0841 |
| 9,835,929 B2* | 12/2017 | Cho | G02B 5/206 |
| 9,908,306 B2* | 3/2018 | Hara | G02B 5/287 |
| 2002/0160673 A1 | 10/2002 | Zupon et al. | |
| 2007/0128381 A1* | 6/2007 | Yajima | B29C 47/0021 |
| | | | 428/1.31 |
| 2007/0254971 A1 | 11/2007 | De Vogel | |
| 2011/0017340 A1 | 1/2011 | Mirossay | |
| 2012/0026580 A1* | 2/2012 | Kiyoto | G02B 5/281 |
| | | | 359/359 |
| 2012/0088050 A1* | 4/2012 | Lavature | B32B 5/028 |
| | | | 428/41.1 |
| 2012/0189828 A1* | 7/2012 | Inomata | G02B 1/105 |
| | | | 428/206 |
| 2012/0234515 A1* | 9/2012 | Kouno | F28F 3/12 |
| | | | 165/67 |
| 2013/0114155 A1* | 5/2013 | Eguro | G02B 5/10 |
| | | | 359/853 |
| 2013/0309482 A1* | 11/2013 | Sugino | B32B 27/18 |
| | | | 428/313.3 |
| 2014/0070442 A1* | 3/2014 | Morita | C08L 23/0815 |
| | | | 264/46.4 |
| 2014/0141199 A1 | 5/2014 | Leonard | |
| 2014/0141676 A1 | 5/2014 | Crandall | |
| 2014/0182676 A1* | 7/2014 | Rosenberg | G02B 5/208 |
| | | | 136/257 |
| 2014/0233092 A1* | 8/2014 | Nojima | B32B 7/02 |
| | | | 359/359 |
| 2014/0320956 A1* | 10/2014 | Taka | G02B 1/11 |
| | | | 359/359 |
| 2014/0335314 A1 | 11/2014 | Aldino et al. | |
| 2014/0377568 A1* | 12/2014 | Riebel | C08K 3/36 |
| | | | 428/446 |
| 2015/0004384 A1* | 1/2015 | Mallette | B32B 27/12 |
| | | | 428/215 |
| 2015/0050486 A1* | 2/2015 | Kim | C04B 28/006 |
| | | | 428/319.3 |
| 2015/0111453 A1 | 4/2015 | Silva | |
| 2015/0219810 A1* | 8/2015 | Taka | G02B 5/0841 |
| | | | 359/584 |
| 2016/0054492 A1* | 2/2016 | Ihara | B32B 17/10 |
| | | | 359/359 |
| 2016/0082697 A1* | 3/2016 | Hara | C03C 17/34 |
| | | | 428/212 |
| 2016/0282529 A1* | 9/2016 | Miyata | G02B 5/208 |
| 2016/0299404 A1* | 10/2016 | Cho | G02B 5/206 |
| 2017/0092885 A1* | 3/2017 | Sakuishi | H01L 51/0097 |
| 2017/0139109 A1* | 5/2017 | Gierens | B32B 17/10036 |

* cited by examiner

MULTI-LAYERED REFLECTIVE INSULATION SYSTEM

CROSS-REFERENCE TO RELATED APPLICATION

This application claims the benefit of U.S. Provisional Patent Application Ser. No. 62/212,486 filed Aug. 31, 2015, titled "MULTI-LAYERED REFLECTIVE INSULATION SYSTEM" and the subject matter thereof is incorporated herein by reference thereto.

TECHNICAL FIELD

The present invention relates generally to multi-layered reflective insulating composites and a method of fabricating those composites.

BACKGROUND ART

The present invention recognizes the importance of recognizing the behavior of mid-range infrared (IR) as a form of electromagnetic radiation other than x-rays, visible light, or radio waves, for example. There is no guarantee that what we see as transparent, opaque, or reflective always corresponds with the same optical properties in IR. Oftentimes materials that appear transparent in the visible range are opaque in the IR and vice versa. Whereas we see wavelengths from about 400 nm (Violet) to 700 nm (Red), most terrestrial objects radiate according to Planck's Law in the range of 2,000 nm to 130,000 nm with the range of peak emissions spanning 8,430 nm at 70.7° C./159.3° F. to 16,240 at −94.7° C./−135.8° F. Thus, the physical difference in spectrum is very large.

In the IR range of the electromagnetic spectrum, while multiple metals can be used successfully as a reflector, gold, silver, and copper are the most effective. Aluminum is frequently used because of its low cost; however, silver and aluminum both form oxides detrimental to IR reflectivity very rapidly, whereas gold and copper do not. While widely publicized that $CO_2$ is a greenhouse gas, it is often not explained the exact mechanism by which this occurs. Additionally, it becomes a leap of perspective to realize that the same mechanism which applies to $CO_2$ also applies to solid and liquid states of matter. Because of the large size of wavelength of mid-range infrared electromagnetic radiation, this size corresponds to harmonics of various states of different bond lengths found in organic materials. In plastics, a result of this is that relatively simple, linear polymers using a few elements like polyethylene or polypropylene are nearly transparent to IR whereas plastics including more complex, non-linear polymers using many elements like polyurethane or polyetherimide are very opaque (or absorbent). This often remains true regardless of visible appearances which, again, may differ greatly.

The present invention comprises a low density, thermally insulating multi-layered reflective insulation system. The multi-layered reflective insulation of the present invention comprises a plurality of layers, including, but not limited to, a combination of any number of the following layers disposed on each other: scattering optics, multi-layer insulation, microsphere film, and polyblend foam.

Various prior art exists in the prior art that disclose multi-layered insulating composites, but each of these have shortcoming which the present invention overcomes.

U.S. Pat. No. 4,442,165 A to Gebhardt, Joseph J., et al., entitled "Low-Density Thermally Insulating Carbon-Carbon Syntactic Foam Composite", discloses an insulating composite comprising a syntactic foam material, pyrolytic graphite, and a boron in layer which enables the composite to reflect infrared energy.

U.S. Pat. No. 6,858,280 B2 to Allen, Mark S., et al., entitled "Microsphere Insulation Systems", discloses microsphere insulation systems whereby particles reduce heat transfer through reflection and scattering.

U.S. Pat. No. 8,857,700 B2 to Jackson, Adam, et al., entitled "Low Temperature Method for Forming Field Joints on Undersea Pipelines", discloses insulation layers including microspheres.

U.S. Pat. No. 8,397,765 B2 to Jackson, Peter, et al., entitled "High Temperature Resistant Insulation for Pipe", discloses thermal foam insulation layers with micro-spheres.

U.S. Pat. No. 6,284,809 B1 to Plummer, John, et al., entitled "Thermally Insulating Syntactic Foam Composition", discloses an insulating syntactic foam composition.

Although the above-referenced patents disclose insulation systems, the present invention provides a low density, thermally insulating multi-layered reflective insulation system that is easy to install, offers increased R-value resulting in increased insulation, and cost effective.

Certain embodiments of the invention have other steps or elements in addition to or in place of those mentioned above. The steps or element will become apparent to those skilled in the art from a reading of the following detailed description when taken with reference to the accompanying figures.

SUMMARY OF THE INVENTION

The present invention comprises a multi-layered reflective insulation system comprising a first protective layer; a first scattering optic layer; microsphere film layers; a polyblend foam layer; a second scattering optic layer; and a second protective layer.

The present invention also comprises a method of manufacture of a multi-layered reflective insulation system comprising a first protective layer; a first scattering optic layer; microsphere film layers; a polyblend foam layer; a second scattering optic layer; a second protective layer; securably disposing the layers on top of each other; and securably attaching the layers.

DETAILED DESCRIPTION OF THE INVENTION

Figure 1:
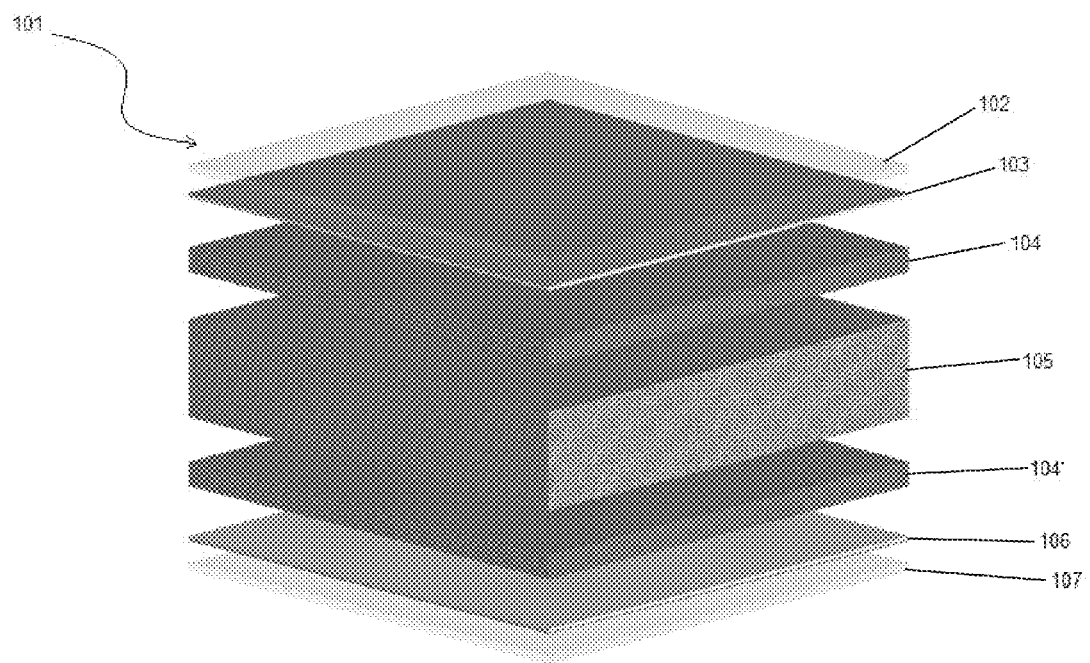
FIG. 1 illustrates a partial sectional isometric view of the multi-layered reflective insulation system of the present invention.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail.

The figures illustrating embodiments of the system are semi-diagrammatic and not to scale and, particularly, some of the dimensions are for the clarity of presentation and are shown exaggerated in the drawing figures.

The same numbers are used in all the drawing figures to relate to the same elements. Alternate embodiments have been included throughout, and the order of such are not intended to have any other significance or provide limitations for the present invention.

For expository purposes, the term "horizontal" as used herein is defined as a plane parallel to the plane or surface of the insulation system, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures. The term "on" means that there is direct contact among elements.

FIG. 1 illustrates a partial sectional isometric view of the multi-layered reflective insulation system of the present invention. Multi-layered reflective insulation system 101 comprises a plurality of layers, including, but not limited to, any combination of any number of the following layers disposed on each other: first protective layer 102; first scattering optic layer 103; microsphere film layers 104 and 104'; polyblend foam layer 105; second scattering optic layer 106; and second protective layer 107. In the preferred embodiment of the present invention, the layers of multi-layered reflective insulation system 101 are arranged in the following order: first protective layer 102; first scattering optic layer 103; microsphere film layer 104; polyblend foam layer 105; microsphere film layer 104'; second scattering optic layer 106; and second protective layer 107. The layers of the multi-layered reflective insulation system 101 are disposed on each other and securably attached using a glue, resin, or other attaching material or process.

Figure 2:
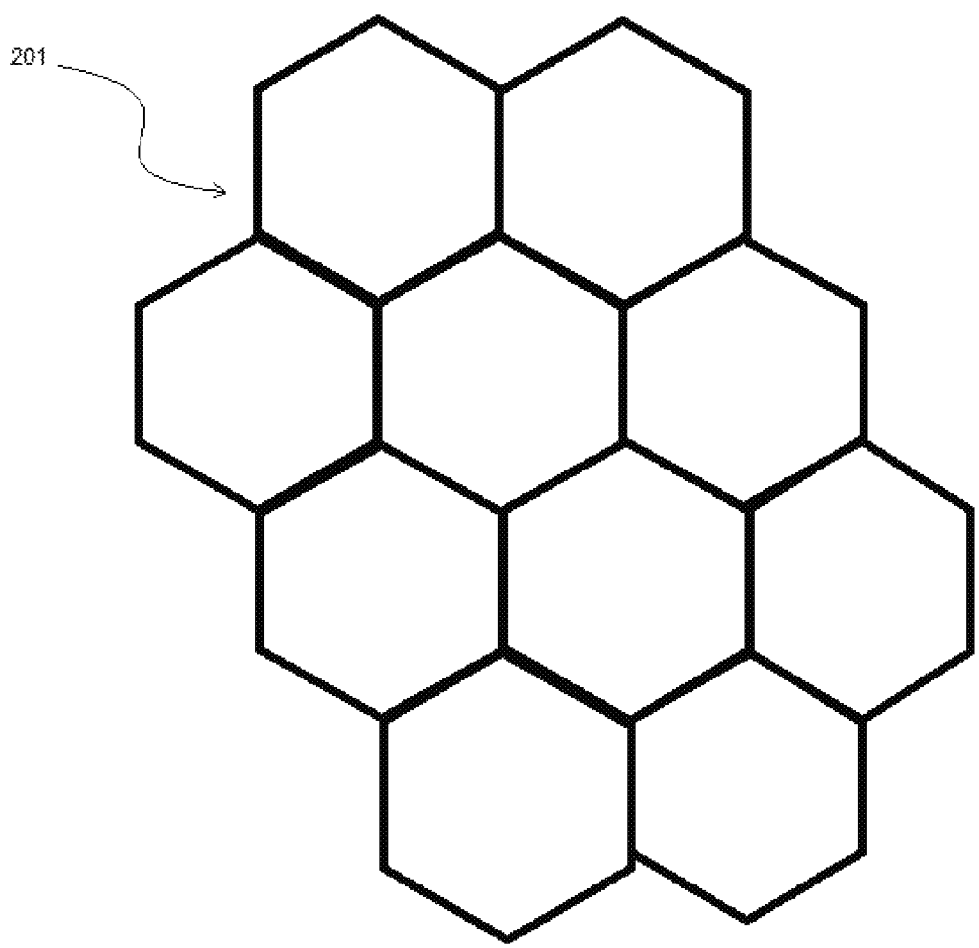
FIG. 2 illustrates a partial sectional view of one embodiment of the embossed tile pattern of the scattering optic layer.

FIG. 2 illustrates a partial sectional view of one embodiment of the tile pattern of first scattering optic layer 103 and/or second scattering optic layer 106 of the present invention. In the preferred embodiment, scattering optics of scattering optic pattern 201 are embossed in a hexagonal pattern.

First protective layer 102 and second protective layer 107 comprise a plastic, or other infrared transparent protective film, that acts as an infrared transparent protective film.

First scattering optic layer 103 and second scattering optic layer 106 comprise a film with an embossed pattern on a polymer foam. This layer provides reflective insulation. The film with an embossed pattern of first scattering optic layer 103 and second scattering optic layer 106 are disposed on a polymer or copolymer foam.

In an alternate embodiment of the present invention, the film with an embossed pattern of first scattering optic layer 103 and second scattering optic layer 106 is copper or copper-colored. In an alternate embodiment of the present invention, the film with an embossed pattern of first scattering optic layer 103 and second scattering optic layer 106 is aluminum or aluminum-colored. Aluminum is preferred for visible light, while copper is preferred for infrared light. First scattering optic layer 103 and second scattering optic layer 106 reflect heat. The multi-layered reflective insulation system 101 keeps warm or cold air in an enclosure or structure insulated with multi-layered reflective insulation system 101, while reflecting warm or cold air from the outside. The first scattering optic layer 103 and second scattering optic layer 106 act as a first barrier to reflect visible and infrared light. Any combination of copper, aluminum, or any metal that aids in reflectance of IR energy can be used on first scattering optic layer 103 and second scattering optic layer 106.

In an alternate embodiment of the present invention, the embossed pattern of first scattering optic layer 103 and/or second scattering optic layer 106 comprise a hexagonal pattern.

In an alternate embodiment of the present invention, the embossed pattern of first scattering optic layer 103 and/or second scattering optic layer 106 comprise a tiled pattern.

In an alternate embodiment of the present invention, the embossed pattern of first scattering optic layer 103 and/or second scattering optic layer 106 comprise a polygon pattern.

In an alternate embodiment of the present invention, the pattern of first scattering optic layer 103 and/or second scattering optic layer 106 comprise a non-embossed pattern.

In an alternate embodiment of the present invention, first scattering optic layer 103 and/or second scattering optic layer 106 comprise no embossed or non-embossed pattern.

First scattering optic layer 103 and second scattering optic layer 106 can compromise any combination of the aforementioned embodiments.

In an alternate embodiment of the present invention, the reflective film of first scattering optic layer 103 and second scattering optic layer 106 comprise Tyvek or other water-resistant, but vapor permeable, polymer textile. This reflective film may or may not be disposed on the film with an embossed pattern, which may or may not be disposed on a polymer or copolymer foam.

Infrared transparent materials for retro-reflective microspheres, including, but not limited to, glass or plastic, boost reflectivity of a first reflective surface or use of multi-layer infrared reflective films with infrared transparent scrims in a reflective insulation.

Microsphere film layers 104 and 104' comprise a plurality of polymers as a manufacturing adhesive and/or particle carrier of microspheres. The microspheres reflect IR energy, thus aiding in overall performance and improved R-value of the multi-layered reflective insulation system 101. Microsphere film layers 104 and 104' further comprise a plurality of phase-change material microspheres for temperature management or polymer microspheres that serve as conductive and radiative insulation. Microsphere film layers 104 and 104' further comprise ceramic or glass microspheres that serve as conductive and radiative insulation.

In an alternate embodiment of the present invention, the microspheres acting as infrared retroreflectors of microsphere film layers 104 and 104' are disposed directly onto polyblend foam layer 105.

In an alternate embodiment of the present invention, the microspheres acting as infrared retroreflectors of microsphere film layers 104 and 104' are made of germanium.

In an alternate embodiment of the present invention, the microspheres acting as infrared retroreflectors of microsphere film layers 104 and 104' are any microspheres that aid in IR reflective energy and that improve the overall R-value of the multi-layered reflective insulation system 101.

In an alternate embodiment of the present invention, microsphere film layers 104 and 104' comprise a syntactic foam.

Polyblend foam layer 105 comprises a polymer or copolymer with or without a fire retardant.

In an alternate embodiment of the present invention, the copolymer of the polyblend foam layer 105 comprises ethylene-vinyl acetate, low-density polyethylene, or any combination of the two.

In an alternate embodiment of the present invention, the copolymer of the polyblend foam layer 105 comprises, at least in part, polyethylene-vinyl acetate.

In an alternate embodiment of the present invention, the copolymer of the polyblend foam layer 105 comprises a polymer alloy foam.

In an alternate embodiment of the present invention, the polymer or copolymer of polyblend foam layer 105 comprises, at least in part, microspheres. The polymer or copolymer is melted and then the microspheres are added. The mixture is then cooled and may be extruded and turned into pellets. The pellets are then turned into polyblend foam layer 105.

In alternate embodiments of the present invention, multi-layered reflective insulation system 101 comprises a plurality of layers. The layers of the multi-layered reflective insulation system 101 are disposed on each other and securably attached using a glue, resin, or other attaching material or process.

In an alternate embodiment of the present invention, holes are displaced through multi-layered reflective insulation system 101. The addition of the holes allows for air permeability. In the preferred embodiment of the present invention, the holes are formed by insertion of heated piercing means through multi-layered reflective insulation system 101. This ensures the holes have closed edges and will not close with the change of the environmental temperature. The holes can be arranged in any pattern or randomly. In an alternate embodiment of the present invention, the holes are formed by punching means, with or without the addition of heat to the punching means. In an alternate embodiment of the present invention, the holes are formed by piercing means, without the addition of heat to the piercing means.

Prior art insulation systems do not include melted holes, copper/aluminum scattering optics layers, and/or microspheres as used in the present invention. The present invention provides the following improvements over prior art insulation systems, including, but not limited to, cost and increased R-value.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying drawings are to be interpreted in an illustrative and non-limiting sense.

What is claimed is:

1. A low density, thermally insulating composite comprising:
   a first protective layer;
   a first scattering optic layer;
   microsphere film layers;
   a polyblend foam layer having microspheres;
   a second scattering optic layer; and
   a second protective layer.

2. A low density, thermally insulating composite according to claim 1, whereby said first scattering optic layer and second scattering optic layer comprise metal that aids in reflectance of IR energy.

3. A low density, thermally insulating composite according to claim 1, whereby said first scattering optic layer and second scattering optic layer each comprise a different metal that aids in reflectance of IR energy.

4. A low density, thermally insulating composite according to claim 1, whereby said first scattering optic layer and second scattering optic layer include a pattern.

5. A low density, thermally insulating composite according to claim 1, whereby said second scattering optic layer is copper.

6. A low density, thermally insulating composite according to claim 1, whereby said first scattering optic layer and said second scattering optic layer reflect heat and scatter infrared light simultaneously.

7. A low density, thermally insulating composite according to claim 1, whereby said first scattering optic layer and said second scattering optic layer create a first barrier to reflect both visible and infrared light.

8. A low density, thermally insulating composite according to claim 1, whereby said first scattering optic layer and said second scattering optic layer are a water-resistant, vapor permeably, polymer textile.

9. A low density, thermally insulating composite according to claim 1, whereby said microsphere film layers increase an R-value of said composite.

10. A low density, thermally insulating composite according to claim 1, whereby said microsphere film layers comprise a plurality of phase-change material microspheres such that a temperature of said composite is managed.

11. A low density, thermally insulating composite according to claim 1, whereby said microsphere film layers comprise a plurality of polymer microspheres such that said polymer microspheres provide conductive and radiative insulation to said microsphere film layers.

12. A low density, thermally insulating composite according to claim 1, whereby said microsphere film layers comprise microspheres directly disposed onto said polyblend foam layer.

13. A low density, thermally insulating composite according to claim 1, whereby said microsphere film layers comprise germanium microspheres.

14. A low density, thermally insulating composite according to claim 1, whereby said polyblend foam layer comprises at least polyethylene-vinyl acetate.

15. A low density, thermally insulating composite according to claim 1, whereby said polyblend foam layer comprises microspheres separate from said microsphere film layers.

16. A method of fabricating a low density, thermally insulating composite comprising:
   a first protective layer;
   a first scattering optic layer;
   microsphere film layers;
   a polyblend foam layer having microspheres;
   a second scattering optic layer;
   a second protective layer;
   securably disposing the layers on top of each other; and
   securably attaching the layers.

17. A method of fabricating a low density, thermally insulating composite according to claim 16, whereby holes are displaced throughout.

* * * * *